(12) United States Patent
Matz et al.

(10) Patent No.: US 6,341,781 B1
(45) Date of Patent: Jan. 29, 2002

(54) SEALING ELEMENT FOR A FACE SEAL ASSEMBLY

(75) Inventors: Berthold Matz, Wolfratshausen; Josef Nosowicz, Geretsried; Wolfgang Ries, Eschenlohe; Reinhard Svejkovsky, Geretsried, all of (DE)

(73) Assignee: Burgmann Dichtungswerke GmbH & Co. KG, Wolfratshausen (DE)

( * ) Notice: Subject to any disclaimer, the term of this patent is extended or adjusted under 35 U.S.C. 154(b) by 0 days.

(21) Appl. No.: 09/678,327

(22) Filed: Oct. 3, 2000

Related U.S. Application Data

(63) Continuation of application No. PCT/EP99/02482, filed on Apr. 13, 1999.

(30) Foreign Application Priority Data

Apr. 15, 1998 (DE) .................................. 298 06 768 U

(51) Int. Cl.[7] ................................................ F16J 15/36
(52) U.S. Cl. ........................ 277/391; 277/389; 277/392; 277/944
(58) Field of Search ................................ 277/389, 391, 277/392, 379, 636, 944

(56) References Cited

U.S. PATENT DOCUMENTS

| 2,512,749 A | | 6/1950 | McCloskey | |
|---|---|---|---|---|
| 2,772,848 A | * | 12/1956 | Holzer et al. | 277/389 |
| 2,939,730 A | * | 6/1960 | Turpin | 277/389 |
| 3,808,816 A | * | 5/1974 | Lucas | 60/23 |
| 4,378,119 A | | 3/1983 | Luxford et al. | |
| 5,013,051 A | | 5/1991 | Hilaris et al. | |
| 5,368,312 A | | 11/1994 | Voit et al. | |
| 5,478,372 A | * | 12/1995 | Stark | 55/521 |

FOREIGN PATENT DOCUMENTS

| DE | 1525825 | 7/1969 |
|---|---|---|
| EP | A1525410 | 2/1993 |

OTHER PUBLICATIONS

John Crane, Prospekt: Gleitringdichtungen, p. 13 (1988).

* cited by examiner

Primary Examiner—Anthony Knight
Assistant Examiner—Enoch E. Peavey

(57) ABSTRACT

A sealing element for a face seal assembly including a bellows portion having mounting portions at its axial ends. One of the mounting portions is designed for non-rotational mounting on a component, e.g. a shaft, and the other for retaining an annular face member. The sealing element is formed, on at least the faces thereof exposed to a medium to be sealed, from a plastics material selected from a group of plastics materials comprising PEEK and ECTFE. The sealing element serves for applying a bias force to the annular face member. The sealing element enables the design of an uncomplicated, easily maintained, externally pressurised single action face seal assembly which is particularly suitable for sealing aggressive media.

5 Claims, 2 Drawing Sheets

SEALING ELEMENT FOR A FACE SEAL ASSEMBLY

This application is a Continuation of PCT International Application No. PCT/EP99/02482 filed on Apr. 13, 1999, which designated the United States, and on which priority is claimed under 35 U.S.C. § 120, the entire contents of which are hereby incorporated by reference.

BACKGROUND OF THE INVENTION

The invention relates to a sealing element for a face seal assembly, and particularly to a sealing element which enables the construction of a face seal assembly having specifically advantageous, but not exclusive, utility for sealing aggressive media.

For sealing aggressive media use has hitherto mainly been made of double action, fluid buffered face seal assemblies, in which only the outer portions thereof subjected directly to the aggressive media are formed of chemically resistant materials. However, double action face seal assemblies are built in a comparatively complex manner and are consequently expensive. In addition, they require a high level of maintenance and a reliable supply of buffer fluid. It has already been proposed (DE-B-1525825) that single action, internally pressurised face seal assemblies having a bellows of a resistant plastics material be employed for sealing aggressive media, in which means for applying bias forces are arranged externally so that they will not be exposed to the aggressive medium. Nevertheless, internally pressurised face seal assemblies have the disadvantage that they exhibit a substantially greater degree of leakage than externally pressurised ones thereby making it necessary to take special precautionary measures in regard to an ecologically sound disposal of the leakage when they are used for aggressive media. Furthermore, it is known (EP-A-133073) to provide an elastomeric corrugated bellows unit rotatable with a shaft and having a cutter-like end portion which rests on a stationary sealing surface to provide therewith a sealing relationship by rubbing linearly along said surface when the shaft is rotated. One cannot assume, that the assembly is of particular aptitude for use in aggressive media. Moreover, the attainable sealing effect is restricted to very low pressures of the medium to be sealed and one must expect relatively high levels of leakage. Consequently, there is a need for an externally pressurised face seal assembly, especially for use with aggressive to very aggressive media, without the disadvantages of the known assemblies.

SUMMARY OF THE INVENTION

In view of the foregoing it is an object of the present invention to provide an improved sealing element suitable for incorporating in a single action face seal assembly for sealing aggressive media. Another object of the present invention is to provide a sealing element suitable for incorporating in a single action face seal assembly for sealing aggressive media which requires minimum maintenance and having a minimum leakage and very compact dimensions.

For achieving the aforesaid object, the present invention provides a sealing element for a face seal assembly including a bellows portion having mounting portions at the axial ends thereof, one of said mounting portions retains an annular face member, said sealing element on at least the faces thereof exposed to the medium to be sealed being formed of a plastics material selected from a group of plastics material including PEEK (acronym for polyetheretherketone) and ECTFE (acronym for ethylene-chlorotrifluoroethylene copolymers). When a sealing element made in accordance with the present invention is incorporated in a single action face seal assembly, not only can this sealing element fulfill the function of dynamically sealing the face seal assembly, but it can also create the necessary static and dynamic biasing forces that should be applied to the annular face member during operation or when stopped. Since the sealing element in accordance with the invention can fulfill a plurality of functions for which separate members have had to be provided hitherto, the invention enables the construction of a single action, externally pressurised face seal assembly which not only exhibits a substantially reduced level of leakage in comparison with conventional single action face seal assemblies, but it can also have compact dimensions thus making it suitable for installation in equipment of limited spatial capacity. The face seal assembly can readily be designed such as to take into account the requirements of e.g. German Standards DIN 24960. The invention thus is a substantial contribution to the development of economical, ecologically sound seals for aggressive medium for which consideration was primarily given to the employment of complex, double action face seal assemblies in the past. In accordance with the invention, the sealing element is formed throughout of the specific aforesaid plastics material. In addition reinforcing inserts in the form of fibre reinforcements may be embedded in the sealing element. The sealing element in accordance with the invention may take the form of a rotating part for common rotation with a rotating component, e.g. a shaft, or of a non-rotating part to be mounted on a stationary component, e.g. a casing.

BRIEF DESCRIPTION OF THE DRAWINGS

The accompanying drawings illustrate a preferred embodiment of the invention together with modifications thereof and serve to explain the principles of the invention. In the drawings.

DESCRIPTION OF THE PREFERRED EMBODIMENT

Reference will now be made in detail to the preferred embodiment of the invention as illustrated in the accompanying drawings.

Although the invention is depicted in connection with its use for sealing the drive shaft of a pump impeller relative to the casing of the pump, it should be understood that the invention is not restricted to this particularly field of application but can also be used, to advantage, whenever there is a need to seal media, especially those of an aggressive nature, from the environment by means of a simply constructed single action face seal assembly.

Figure 1:
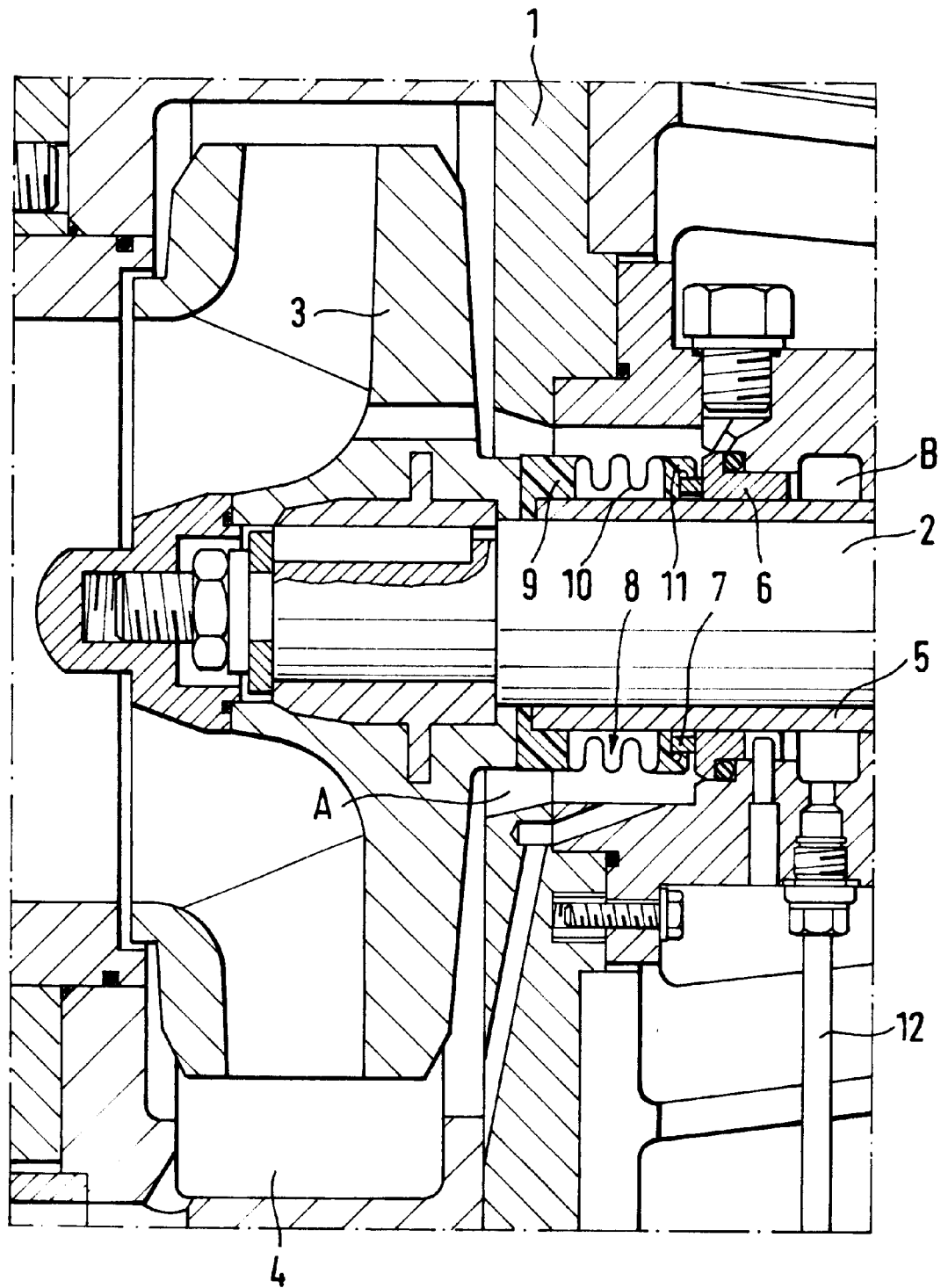
FIG. 1 is a fragmentary, longitudinal sectional view of a face seal assembly incorporating a sealing element in accordance with the present invention for sealing a pump.

In FIG. 1, a pump casing bears the reference number 1, the drive shaft the reference number 2, and an impeller attached to the drive shaft the reference number 3. The impeller 3 rotates in a pump chamber 4. A sleeve 5, on which a face seal assembly is disposed, is mounted on the shaft 2. The face seal assembly comprises a pair of annular face members consisting of an annular face member 6 retained in non-rotational manner on a casing 1 and a rotary annular face member 7 for common rotation with the drive shaft. In operation, the annular face members 6, 7 co-operate with each other to form a clearance between the facing sealing surfaces of the annular face members 6, 7 for sealing a space A located around the outer periphery of the face seal assembly from a space B which is in fluidic contact with inner peripheral portions of the face seal assembly. The outer peripheral space A is connected to the pump chamber 4 and, as a consequence thereof, is subjected to the medium processed by the pump.

The space B may be unpressurised and, as a consequence thereof, may be in direct contact with the atmosphere or, as illustrated, it may represent an annular space which is connected to an outlet conduit 12 for removing a small amount of leakage of the medium being sealed that has collected in the space B.

The rotary annular face member 7 is retained by a sealing element bearing the general reference number 8. The sealing element comprises a bellows portion 10 whose axial ends are connected to a pair of mounting portions 9, 11. One of the mounting portions 9, 11, namely the left hand mounting portion 9 in FIG. 1, has a mounting flange extending radially inwardly from its inner periphery towards the shaft 2, said flange being clamped between a adjacent face of the pump impeller 3 and an adjacent end face of the sleeve 5 in order to fix the mounting portion 9 in non-rotational manner relative to the shaft 2. Other forms of mounting means for fixing the mounting portion 9 in non-rotational manner could be provided, and reference will be made thereto hereinbelow.

The other mounting portion 11, at the right hand side in FIG. 1, carries the rotary annular face member 7 which can be mounted thereon in various manners, and reference thereto will also be made hereinbelow. The mounting of the annular face member 7 on the mounting portion 11 shown in FIG. 1 is in the form of a press-fit by pressing, by means of application of an external force, the annular face member 7 into a recess of reduced diameter of the mounting portion 11. As an alternative a shrink-fit can be provided between these two parts.

The bellows portion 10 extending between the mounting portions 9, 11 may be formed in various manners, with the proviso that it produces a resilient connection between the rather stiff mounting portions 9, 11 thereby enabling relative axial and radial movement of the mounting portions 9, 11. Furthermore, the bellows portion 10 serves for applying an axial bias force to the mounting portion 11 retaining the rotary annular face member 7 so as to press the rotary annular face member 7 against the stationary annular face member 6 thereby holding the sealing surfaces of the annular face members 6, 7 in sealing engagement with each other when the face seal assembly is not in operation. The bellows portion 10 preferably has a serpentine cross-sectional configuration thereby augmenting its resilient properties.

In accordance with the invention, the sealing element 8, consisting of the bellows portion 10 and the end mounting portions 9, 11, is resistant to the medium being sealed. Namely the sealing element 8 is made of a plastics material taken from the group of materials comprising polyetheretherketone (sometimes identified by the acronym PEEK) and ethylene-chlorotrifluoroethylene copolymers (sometimes identified by the acronym ECTFE). PEEK is obtainable from the company Ensinger GmbH & Co., D-93413 Cham under the tradename TECAPEEK, and ECTFE is obtainable from the company Green, Tweed & Co., Kulpsville, Pa., USA under the tradename HALAR. Both of these plastics materials are characterized by a high level of resistance to a plurality of alkalies and acids, and a thermal resistance up to a temperature of approximately 250° C. (PEEK) or 160° C. (ECTFE), respectively. Another advantage of these materials is in their excellent resilient properties even at higher temperatures and hence their ability to apply the previously mentioned bias force for biasing the rotary annular face member 7 against the stationary annular face member 6 whereby separate biasing means such as were used in conventional face seal assemblies e.g. in the form of bias springs, are not necessary.

The rotary sealing element 8 is in the form of an integral part in which the bellows portion 10, and the mounting portions 9, 11 are formed from the aforesaid plastics material. The mounting portions 9, 11 and the bellows portion 10 could also be formed of different plastics materials when using a multi-component plastics moulding process.

If greater demands are made in regard to the pressure levels needing sealing, the central bellows portion 10 may have a metallic part e.g. a spring steel, which is embedded in the plastics material and is suitably connected to the mounting portions 9, 11 in fluid-tight manner. The mounting portions 9, 11 themselves may be separate pre-formed part of the aforementioned plastics materials.

Furthermore, as another alternative the plastics material for the mounting portions 9, 11 and the intermediate bellows portion 10 may be reinforced in appropriate manner e.g. by means of SiC fibres, glass fibres, ceramic fibres or graphite fibres i.e. to form a fibre-reinforced composite material.

The annular face member 7 may consist of any suitable material that is resistant to aggressive media, such as silicon carbide for example, or ceramic sintered materials such as aluminium oxide or the like.

The rotary annular face member 7 may be a separate component (FIGS. 1 and 2B) which is mounted on the mounting portion 11 of the sealing element 8 as previously described, or, it may be an integral component (FIG. 2A) of the mounting portion 11.

Figure 2A:
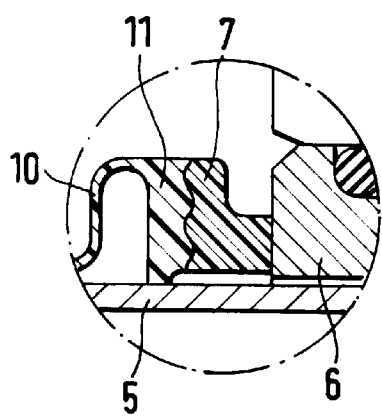
FIGS. 2A, 2B are detailed views of modifications of a means for retaining an annular face member on the sealing element.

FIG. 2A shows an integral construction of the annular face member 7 formed by sintering a material suitable for an annular face member on the mounting portion 11.

Figure 2B:
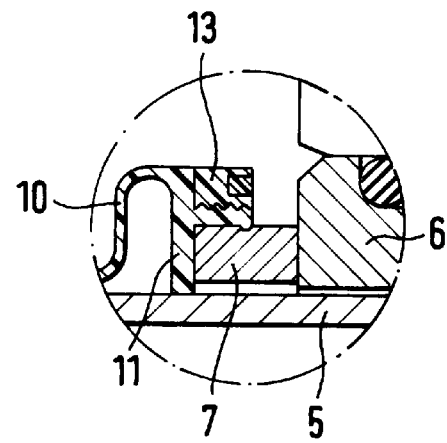

FIG. 2B depicts an alternative manner of mounting the annular face member 7 on the mounting portion 11 by means of a clamping ring 13 having a screw thread on its inner periphery which can co-operate with a screw thread on the outer periphery of a recess in the mounting portion 11. The two threads have complementary, wedge shaped threaded core portions so that a radial force will be exerted when the clamping ring 13 is screwed onto the mounting portion 11 thereby creating a firm press-fit between the annular face member 7 and the mounting portion 11.

Figure 3A:
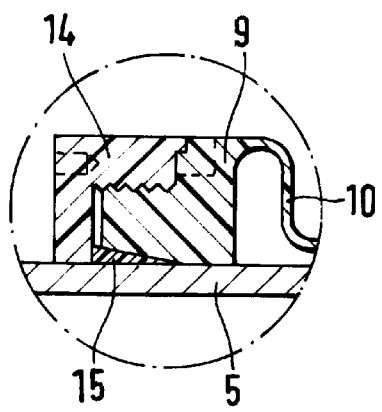
FIGS. 3A, 3B are detailed views of modifications of a means for fixing the sealing element on a component.
Figure 3B:
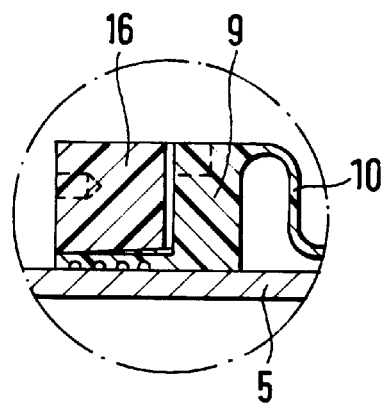

FIGS. 3A and 3B show alternative ways of mounting the mounting portion 9 of the sealing element 8 relative to the shaft 2 or the sleeve 5. In the arrangement of FIG. 3A, there is provided a clamping ring 14 which can be placed on the mounting portion 9 to form a threaded connection. A wedging element 15 is pressed into the space between the sleeve 5 or the drive shaft 2 and the mounting portion 9 due to the axial movement of the clamping ring 14 resulting therefrom, thereby producing a frictional, non-rotational connection between these parts simultaneously, creating an effective seal therebetween.

FIG. 3B shows a clamping ring 16 of similar construction to that of FIG. 2B for pressing a section of the mounting portion 9 against the sleeve 5. Instead of a clamping ring, an expanding ring could be screwed into a threaded recess in the mounting portion 9 so as to cause the mounting portion 9 to spread out radially. Finally, a tensioning ring whose radial dimension can be altered e.g. by means of an adjusting screw could be placed around the mounting portion 9. There are other possible ways of obtaining a non-rotational, sealed connection between the mounting portion 9 and the shaft 2 or the sleeve 5, respectively for conveying the rotation of the shaft 2 via the mounting portion 9, the intermediate bellows portion 10 and the mounting portion 11 to the annular face member 7 retained thereon so that, in operation, the annular face member 7 is rotated, without slippage, by the shaft 2 in which during rotation mechanical and dynamic bias forces act on rotary annular face member 7 urging it towards the stationary annular face member 6.

The sealing element in accordance with the present invention may directly be incorporated in a face seal assembly or offered in the form of a separate component for subsequent mounting. The structural dimensions of a face seal assembly subjected externally to the medium and having a sealing element in accordance with the present invention can be such that it will be suitable for the tight spaces found in a standard installation. Although the invention has been described hereinabove on the basis of an embodiment of the sealing element for mounting on a rotary component, it should be understood that the sealing element could also take the form of a stationary element of a face seal assembly when it is used in certain types of application e.g. when employed in cooling water pumps in motor vehicles. In this case, the annular face member retained by the bellows unit of the sealing element would co-operate with an annular face member rotating with the shaft. In such forms of utilisation, the minimisation of the constructional dimensions of the face seal assembly and the leakage thereof would constitute the items of prime consideration. A matter of importance in every case is that the sealing element is sufficiently chemically resistant, has excellent resilient properties and retains its mechanical and thermal properties even at higher temperatures of e.g. approximately 100° C. Moreover, the bellows portion is sufficiently torsionally stiff as to be able to convey the torque occurring in operation to the annular face member without substantial torsional deformation.

What is claimed is:

1. A sealing element for a face seal assembly, including a bellows portion and a pair of non-corrugated mounting portions axially spaced from each other, said bellows portion extending between said mounting portions, one of said mounting portions serving for mounting an annular face member thereon and the other for mounting to a rotary member, said bellows portion having spring-like properties for applying a resilient bias force to said one of said mounting portions, in which said bellows and mounting portions are an integrally formed part made throughout of a plastic material selected from a group of plastic materials comprising PEEK and ECTFE.

2. The sealing element as claimed in claim 1, wherein the annular face member is a separate part mounted on said one of said mounting portions by a frictional fit.

3. The sealing element as claimed in claim 1, wherein the annular face member is a separate part mounted on said one of said mounting portions by a form fit.

4. The sealing element as claimed in claim 1, wherein the annular face member is integral with said one of said mounting portions.

5. The sealing element as claimed in claim 4, wherein a sealing face of the annular face member is coated with a material having tribologic properties.

\* \* \* \* \*